United States Patent [19]

Hirabayashi

[11] Patent Number: 5,299,519
[45] Date of Patent: Apr. 5, 1994

[54] EXTERNAL MEMORY FOR ELECTRONICALLY CONTROLLED SEWING MACHINE

[75] Inventor: Shintaro Hirabayashi, Nagoya, Japan

[73] Assignee: Brother Kogyo Kabushiki Kaisha, Nagoya, Japan

[21] Appl. No.: 886,109

[22] Filed: May 21, 1992

[30] Foreign Application Priority Data

Aug. 31, 1991 [JP] Japan .................................. 3-246973

[51] Int. Cl.$^5$ .............................................. D05B 3/02
[52] U.S. Cl. ................................ 112/456; 112/121.12; 112/457; 341/67
[58] Field of Search ........... 112/456, 457, 453, 121.12, 112/121.11, 103; 364/470; 341/67

[56] References Cited

U.S. PATENT DOCUMENTS

| | | |
|---|---|---|
| 4,388,883 | 6/1983 | Hirota et al. |
| 4,464,650 | 8/1984 | Eastman et al. ................... 341/67 X |
| 4,858,542 | 8/1989 | Kato et al. ..................... 112/103 X |
| 4,899,287 | 12/1990 | Hulshoff et al. ............... 112/457 X |
| 4,998,489 | 3/1991 | Hisatake et al. ..................... 112/103 |
| 5,034,742 | 7/1991 | Bond et al. ............................. 341/67 |
| 5,153,591 | 10/1992 | Clark .................................. 341/67 X |

FOREIGN PATENT DOCUMENTS 3-140187  6/1991  Japan .

OTHER PUBLICATIONS

*The Winn L. Rosch Hardware Bible,* Rosch, Winn L.; Brady Publishing: NY, 1992, pp. 247-250.

*Primary Examiner*—Peter Nerbun
*Attorney, Agent, or Firm*—Oliff & Berridge

[57] ABSTRACT

In a sewing machine, a needle and a work fabric are relatively moved in X and Y directions according to driving data indicative of a needle location. An external ROM, which functions as an external memory, preliminarily stores compressed stitch data or compressed display data, and also preliminarily stores a program for converting the compressed stitch data into the driving data indicative of the needle location or a program for converting the compressed display data into dot pattern data. The manner of compression of the stitch data and the display data is not limited, thereby improving the flexibility of the external memory.

10 Claims, 11 Drawing Sheets

EXTERNAL MEMORY FOR ELECTRONICALLY CONTROLLED SEWING MACHINE

BACKGROUND OF THE INVENTION

1. Field of the Invention

The present invention relates to an external memory for an electronically controlled sewing machine and, more particularly, to such an external memory for converting compressed stitch data for stitch patterns into driving data for a driving motor provided in the sewing machine and outputting the driving data to the sewing machine or for converting compressed display data to be used for pattern display into dot data to be displayed on a display and outputting the dot data to the sewing machine.

2. Description of Related Art

In a conventional electronically controlled sewing machine, stitch data for a plurality of stitch patterns, such as character patterns and figure patterns corresponding to code numbers of the stitch patterns, are preliminarily stored in a nonvolatile memory such as a ROM provided in a control device, and a desired stitch pattern selected by operating a pattern select key, such as a ten-key, is sewn on a work fabric.

In connection with a recent electronically controlled sewing machine having been practically applied, a ROM card (pattern card), for example, is prepared to store stitch data for many stitch patterns in every kind of pattern, so as to sew many stitch patterns of various kinds. The ROM card storing a desired stitch pattern is adapted to be mounted to a body of the sewing machine. The desired stitch pattern in the ROM card is selected to read stitch data for this stitch pattern, and the stitch pattern is sewn on a work fabric. In this case, the ROM card preliminarily stores stitch data only, and a control program for reading the stitch data is stored in a ROM provided in a control device of the sewing machine.

There has been proposed in U.S. Pat. No. 4,388,883 that a stitch pattern is divided into many blocks and stitch data of the stitch pattern is stored in a compressed condition from position data of apexes of the blocks and the number of stitches in the blocks. Accordingly, it is considered that the stitch data in the ROM card may be stored in a compressed condition by various compression techniques, so as to store many stitch patterns.

In the case where the stitch data of stitch patterns are stored in a compressed condition in the ROM card, and where the control program for reading the stitch data is stored in the ROM of the control device in the sewing machine, it is necessary to identify a data structure of the stitch data of stitch patterns stored in the ROM of the control device in the sewing machine with a data structure of the stitch data of stitch patterns stored in the ROM card. Therefore, compression of the stitch data of stitch patterns stored in the ROM card or change of the compressed condition in the ROM card is limited by the data structure of the stitch data stored in the ROM of the control device, that is, by the data read control program stored in the ROM of the control device. Furthermore, when the data structure of the stitch data stored in the ROM of the control device in the sewing machine is changed, it is necessary to change the data structure of the stitch data stored in the ROM card.

SUMMARY OF THE INVENTION

It is accordingly an object of the present invention to provide an external memory for use with an electronically controlled sewing machine which can improve storage capacity and flexibility by preliminarily storing compressed stitch data or compressed display data and also by preliminarily storing a data read-and-convert control program for reading the compressed stitch data and converting the same into driving data for driving the sewing machine or a data read-and-convert control program for reading the compressed display data and converting the same into driving data for driving a display.

According to a first aspect of the present invention, there is provided in an external memory for use with an electronically controlled sewing machine including a first stepping motor for driving a needle in an X direction in a plane intersecting an axis of the needle, a second stepping motor for driving a work fabric in a Y direction perpendicular to the X direction independently of the needle to generate relative movement of the work fabric with respect to the needle, control means for controlling the first and second stepping motors according to driving data relating to the relative movement in the X and Y directions, and a connector for removably connecting the external memory; the improvement characterized in that the external memory preliminarily stores stitch data of at least one stitch pattern and also stores a data read-and-convert control program for reading the stitch data of the stitch pattern designated under the condition where the external memory is connected to the connector, converting the read stitch data into the driving data, and supplying the driving data to the control means.

With this construction, the external memory preliminarily stores stitch data of at least one stitch pattern and also stores a data read-and-convert control program for reading the stitch data of the stitch pattern designated under the condition where the external memory is connected to the connector, converting the read stitch data into the driving data, and supplying the driving data to the control means.

Accordingly, irrespective of a manner of compression of the stitch data, the compressed stitch data can be converted into the driving data to be used for stitch formation, and the driving data can be supplied to the control means. It is unnecessary to identify a data structure of stitch data stored in an internal memory provided in the sewing machine with a data structure of the stitch data stored in the external memory. Furthermore, even when the data structure of the stitch data stored in the internal memory is changed, it is unnecessary to change the data structure of the stitch data stored in the external memory. Accordingly, a degree of freedom of designing and manufacturing of the external memory and flexibility of the external memory can be improved. Furthermore, the driving data may be a driving pulse train data for driving the stepping motors or a position data indicative of every stitch position by an absolute position or a relative position.

According to a second aspect of the present invention, there is provided in an external memory for use with an electronically controlled sewing machine including a display device having a liquid crystal display, control means for controlling the display device according to driving data relating to display pattern on the liquid crystal display, and a connector for removably connecting the external memory; the improvement characterized in that the external memory preliminarily stores a plurality of display data for the display pattern on the liquid crystal display and also stores a data read-and-convert control program for reading the display data designated under the condition where the external memory is connected to the connector, converting the read display data into the driving data, and supplying the driving data to the control means.

With this construction, the external memory preliminarily stores a plurality of display data for the display pattern on the liquid crystal display and also stores a data read-and-convert control program for reading the display data designated under the condition where the external memory is connected to the connector, converting the read display data into the driving data, and supplying the driving data to the control means. Accordingly, irrespective of a manner of compression of the display data, the compressed display data can be converted into the driving data for driving the display, and the driving data can be supplied to the control means. It is unnecessary to identify a data structure of display data stored in the internal memory with a data structure of the display data stored in the external memory. Moreover, even when the data structure of the display data stored in the internal memory is changed, it is unnecessary to change the data structure of the display data stored in the external memory. Accordingly, a degree of freedom of designing and manufacturing of the external memory and a flexibility of the external memory can be improved.

Other objects and features of the invention will be more fully understood from the following detailed description and appended claims when taken with the accompanying drawings.

DETAILED DESCRIPTION OF THE PREFERRED EMBODIMENTS

A preferred embodiment of the present invention will now be described with reference to the drawings.

Figure 1:
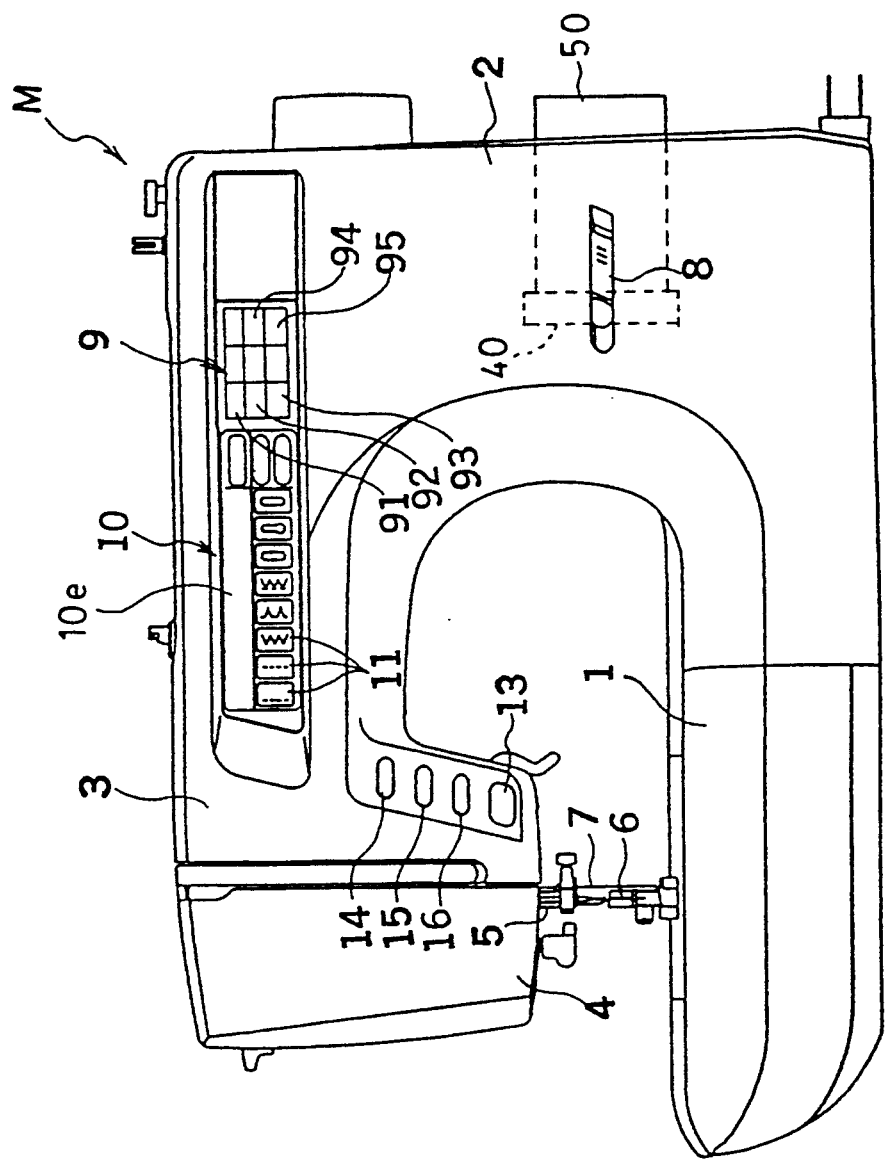
FIG. 1 is a front elevation of an electronically controlled sewing machine to which the present invention is applicable.

Referring to FIG. 1, reference character M generally denotes an electronically controlled sewing machine. A body of the sewing machine M has a bed 1, a pedestal 2, an arm 3, and a head 4. The head 4 is provided with a presser bar 7 having a presser foot and with a needle bar 5 having a needle 6. The bed 1 is provided with a feed dog 28 (see FIG. 2). Like a conventional electronically controlled sewing machine, the body of the sewing machine M includes a needle bar lifting mechanism for vertically moving the needle bar 5, a feed dog lifting mechanism for vertically moving the feed dog 28, a needle bar rocking mechanism for rightwardly and leftwardly rocking the needle bar 5, a feed dog rocking mechanism for forwardly and backwardly rocking the feed dog 28, a machine motor 20 for driving the needle bar lifting mechanism and the feed dog lifting mechanism, a stepping motor 47 for driving the needle bar rocking mechanism, a stepping motor 48 for driving the feed dog rocking mechanism, and a control device C (see FIG. 3).

A large-sized liquid crystal display 10 is provided on a front surface of the arm 3. The display 10 may indicate twenty characters in three lines, for example, by dot patterns. In addition, the display 10 may also indicate a plurality of stitch patterns, such as figures and symbols. The display 10 is provided with touch keys 11 formed of 30 transparent electrodes for the purposes of pattern selection and command signal inputting, so that a desired one of stitch patterns displayed may be selected by depressing one of the touch keys 11.

In the vicinity of the head 4, the arm 3 is provided with a plurality of switches including a start/stop switch 13, a thread cutting switch 14, a needle position changing switch 15, and a reverse sewing switch 16. The pedestal 2 is provided with a card insert slot into which a ROM card (external memory) 50 storing stitch data for many stitch patterns relating to character sewing and pattern sewing is to be inserted. The ROM card 50 is adapted to be connected to a card connector 40 provided in the body of the sewing machine M. An operation panel 9 is provided on a front surface of the pedestal 2 at an upper end portion thereof. The operation panel 9 is provided with nine function keys (practical sewing key 91, character sewing key 92, pattern sewing key 93, internal memory select key 94 for selecting stitch patterns stored in a ROM provided in the body of the sewing machine M, external memory select key 95 for selecting stitch patterns stored in the ROM card (pattern card) 50 connected, a stitching key, a stitch method key, an explanation key and a using method key). Reference numeral 8 denotes a speed volume sliding lever for adjusting a sewing speed.

There will now be described a mechanical construction relating to fabric feed, provided in the body of the sewing machine M.

Figure 2:
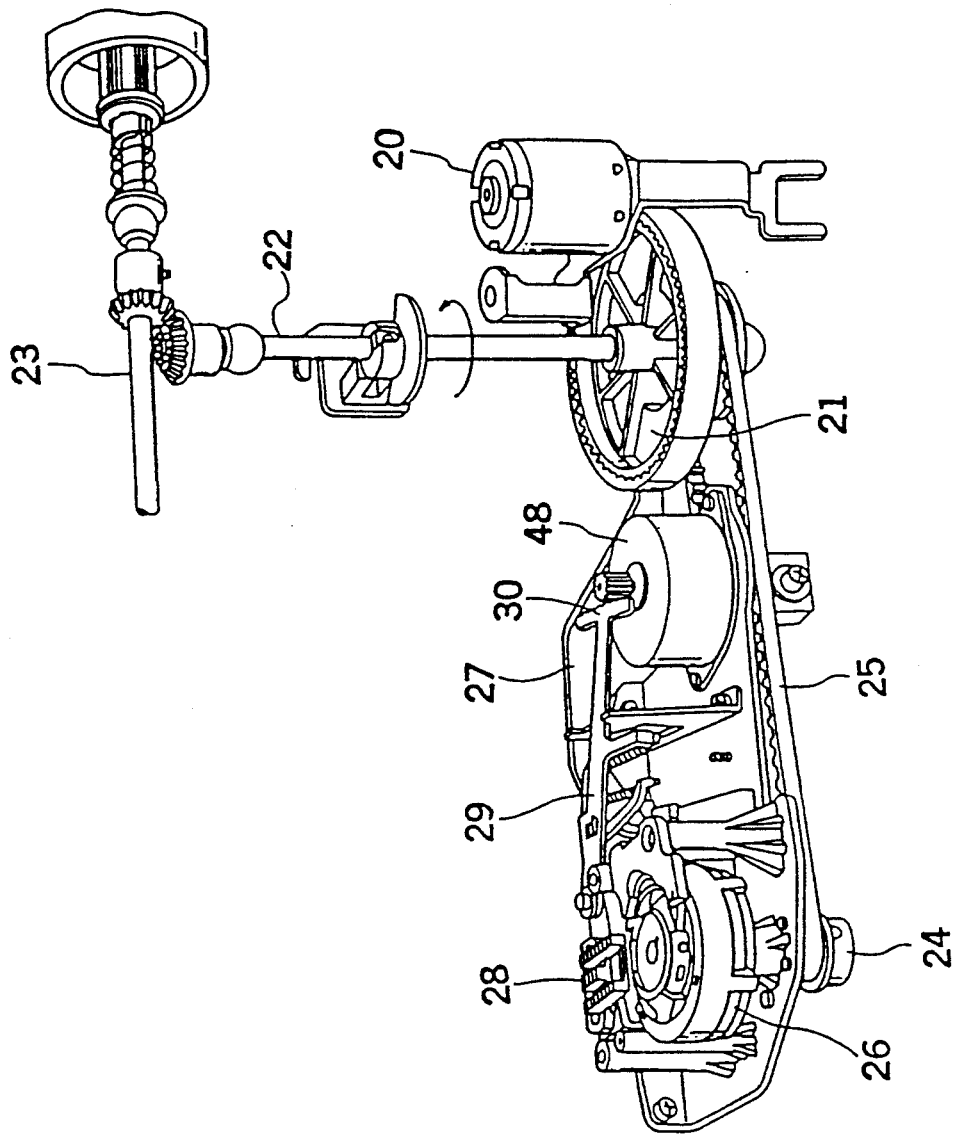
FIG. 2 is a perspective view of a mechanical construction for feeding a work fabric.

Referring to FIG. 2, torque of the machine motor 20 is transmitted through a drive pulley 21 and a transmitting shaft 22 to a main shaft 23. The torque is also applied to a rotating hook 26 through a timing belt 25 wrapped between the drive pulley 21 and a rotating hook shaft pulley 24. The feed dog 28 is vertically moved by the driving force of the machine motor 20 through a feed dog lifting complete 27 linked to the drive pulley 21. A link mechanism 29 is connected to the feed dog 28 to reciprocate the same in a fabric feeding direction (forwardly and reversely). The link mechanism 29 is provided at its one end with a sector gear 30. The sector gear 30 is reciprocated by forward and reverse rotation of the stepping motor 48 to thereby reciprocatively drive the feed dog 28 in the fabric feeding direction. That is, the feed dog 28 is reciprocated in the fabric feeding direction in timing relationship with the vertical movement thereof by the machine motor 20, thereby effecting forward feed or reverse feed of a work fabric. Like an ordinary sewing machine, the main shaft 23 is connected to the needle bar 5, so that the needle bar 5 is vertically reciprocated by driving the main shaft 23, thus sewing the work fabric.

Figure 3:
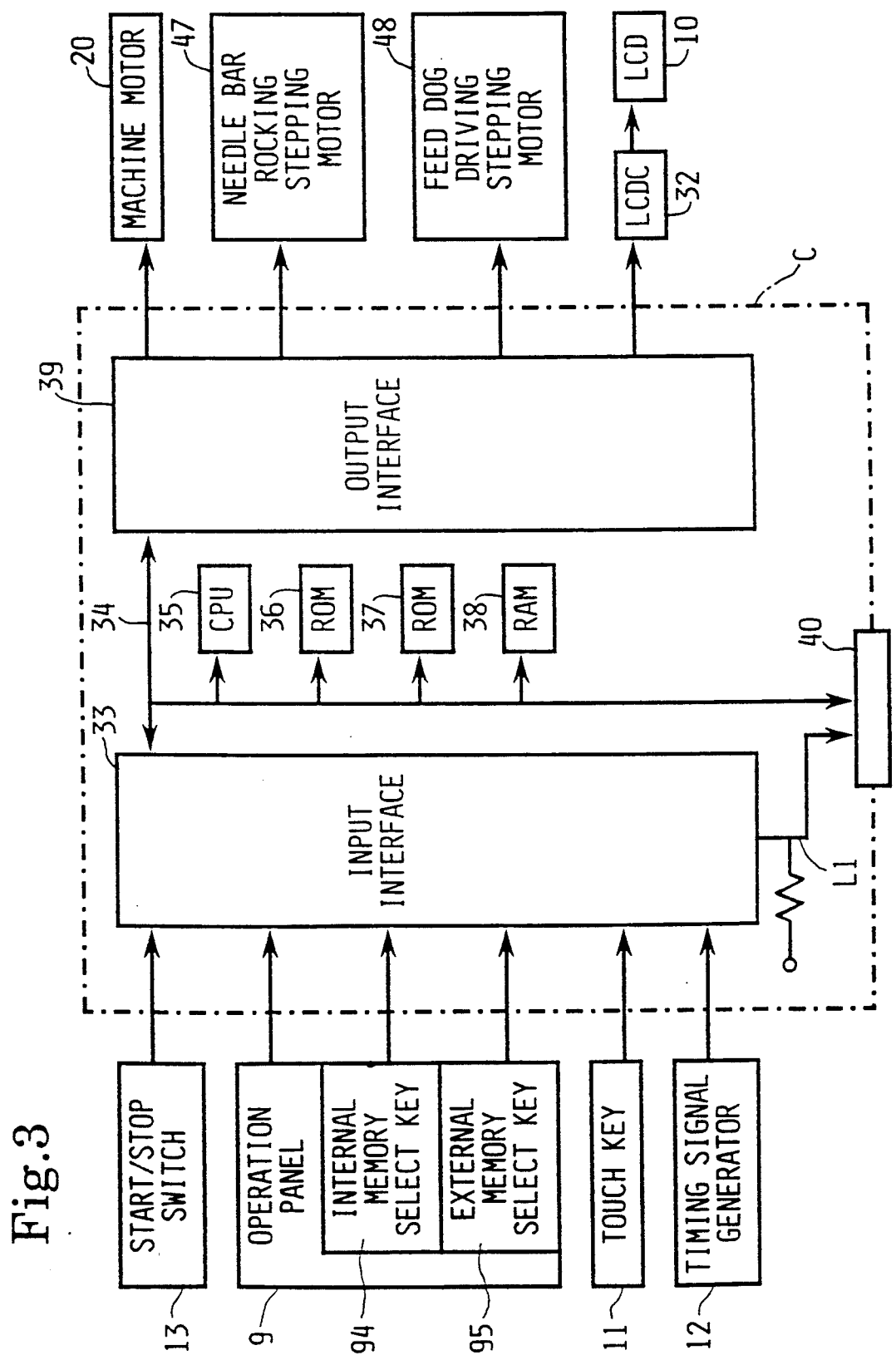
FIG. 3 is a block diagram of a control system in the electronically controlled sewing machine.

A control system of the sewing machine M is schematically illustrated in FIG. 3.

Referring to FIG. 3, the control device C includes a microcomputer including a CPU 35, ROMs 36 and 37, a RAM 38, an input interface 33, and an output interface 39 both connected through a bus 34 such as a data bus to the CPU 35. The start/stop switch 13, the operation panel 9, the touch keys 11 of the display 10, and a timing signal generator 12 are connected to the input interface 33. Furthermore, signals from the other keys and switches are supplied to the input interface 33. Driving currents and driving pulse signals are supplied from the output interface 39 to the machine motor 20, the stepping motor 47 for rocking the needle bar 5, the stepping motor 48 for driving the feed dog 28, and a display controller 32 for driving the display 10. The timing signal generator 12 is provided in connection with the main shaft 23 to detect a rotational phase of the main shaft 23. The card connector 40 is connected to the bus 34.

Figure 4:
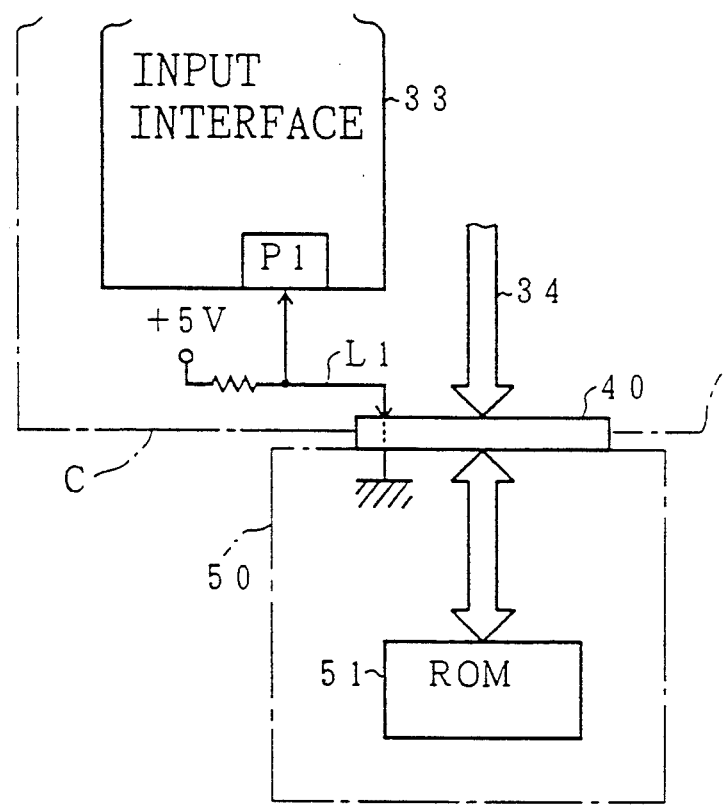
FIG. 4 is an enlarged detailed view illustrating an essential part of the control system shown in FIG. 3 under the condition where a ROM card is mounted to the sewing machine.

As shown in FIG. 4, an input port P1 of the input interface 33 is connected through a connection line L1 to a first pin, for example, of the card connector 40. The connection line L1 is supplied with +5 V, and the input port P1 is maintained in a pull-up state or first state, for example a high or "H" level.

The internal data ROM 36 of the microcomputer preliminarily stores stitch data of many stitch patterns relating to each of practical sewing, character sewing, and pattern sewing, pattern display data for displaying each of these stitch patterns, and pattern group display data for collectively displaying every six of these stitch patterns as one group (on one screen) for the purpose of easy selection of a desired stitch pattern.

The stitch data of each pattern is stored in the form of a pair of needle rocking data for rocking the needle 6 in the right and left direction (Y direction) and feed data for feeding a work fabric in the fabric feeding direction (X direction) by the number of stitches. Furthermore, the stitch data is stored in a predetermined compressed condition so that a large amount of stitch data may be stored.

The ROM 37 preliminarily stores a drive control program for driving the machine motor 20 and driving the stepping motors 47 and 48 according to driving data to be hereinafter described, a display control program for supplying dot data to the display controller 32 and displaying a stitch pattern on the display 10, a control program for selection of a stitch pattern, a control program for data ROM setting change control, a control program for stitch pattern display control, and a control program for stitch data read control, these last three control programs being characteristic in the present invention and to be hereinafter described. The RAM 38 has a plurality of buffers for temporarily storing the driving data for sewing and the dot data for displaying, and also has various memories for temporarily storing results of computation obtained by the CPU 35.

The ROM card 50 is prepared for each kind of stitch pattern, such as character patterns. The ROM card 50 may be removably connected to the connector 40. As shown schematically in FIG. 4, when the ROM card 50 is mounted to the body of the sewing machine M, the first pin of the connector 40 is grounded, and the "H" level signal at the input port P1 is forcibly changed into a second state, for example a low or "L" level.

Figure 5:
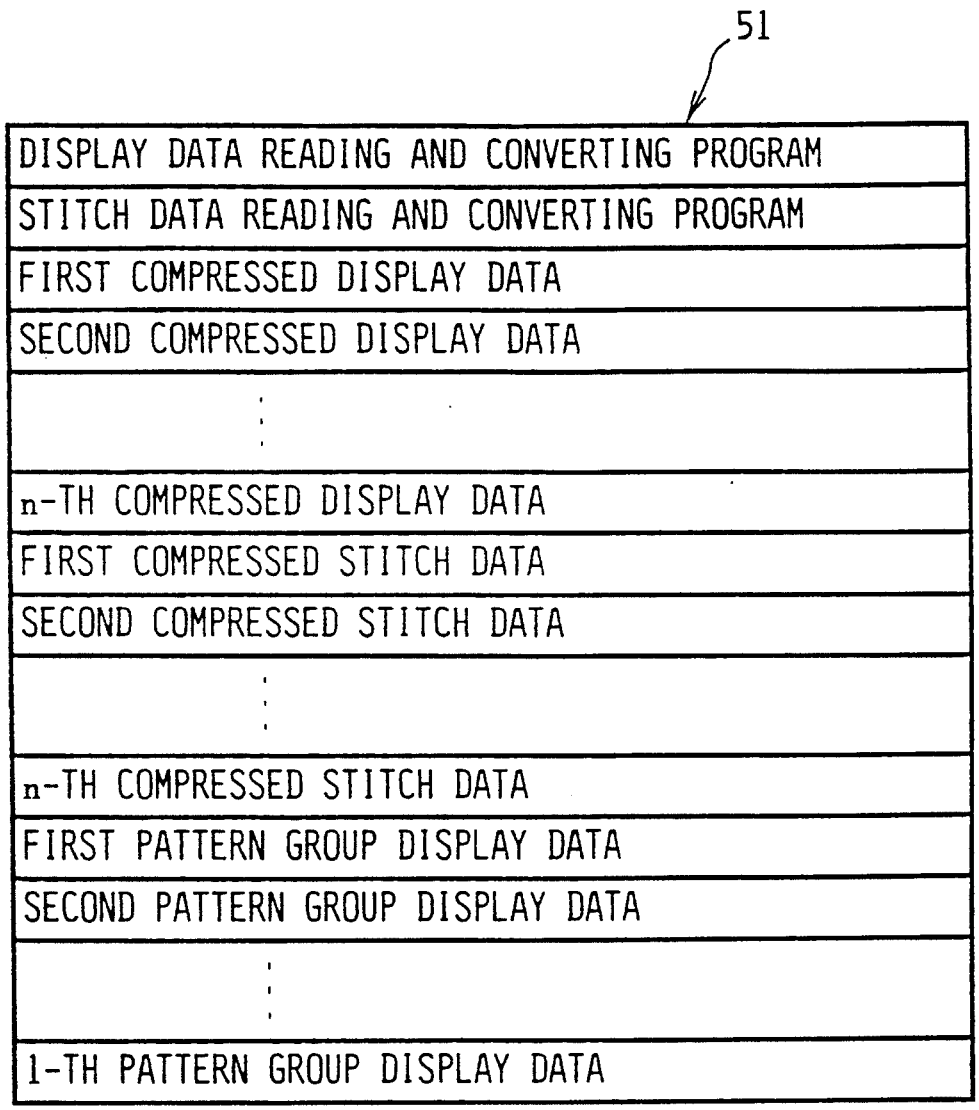
FIG. 5 is a chart illustrating a data structure in the ROM card.

As shown in FIG. 5, an external data ROM 51 provided in the ROM card 50 preliminarily stores stitch data of many (n) stitch patterns relating to both character sewing and pattern sewing, pattern display data for displaying each of these stitch patterns, and pattern group display data for collectively displaying every six of these stitch patterns as one group (on one screen) selected from a plurality (i) of groups for the purpose of easy selection of a desired stitch pattern. The stitch data is stored in a predetermined compressed condition so that a large amount of stitch data may be stored. Similarly, the pattern display data and the pattern group display data are stored in a predetermined compressed condition. Data compression may be effected by forming outline data represented by a Bezier curve composed of a start point, an end point and a control point, and by converting the outline data into dot pattern data.

Moreover, the external data ROM 51 preliminarily stores a display data read-and-convert control program for developing compressed display data and converting the developed display data into dot data to be displayed on the display 10 and a stitch data read-and-convert control program for developing compressed stitch data and converting the developed stitch data into driving data for driving the stepping motor 47 and driving data for driving the stepping motor 48. However, the compressed condition of the compressed stitch data and the compressed display data stored in the external data ROM 51 is different from the compressed condition of the compressed stitch data and the compressed display data stored in the internal data ROM 36.

As described in U.S. Pat. No. 4,388,883, for example, the compressed stitch data stored in the internal data ROM 36 is constituted of apex data of each block to be formed by dividing a pattern into a plurality of rectangular or triangular blocks and stitch density data for embroidering the inside of the block by satin stitch. A needle location on the opposed sides of the block is computed from the apex data and the stitch density data. On the other hand, as described in Japanese Patent Laid-open No. Hei 3-140187, for example, the compressed stitch data stored in the external data ROM 51 is constituted of outline data representing an overall closed area of a pattern to be embroidered with a single continuous outline. The overall closed area is divided into a partial closed area simplified according to the outline data, and a needle location is computed by automatically computing the order of the needle location.

There will now be described data ROM setting change control, stitch pattern display control, and stitch data read control with reference to the flowcharts shown in FIGS. 6 to 12, wherein reference characters Si (i=10, 11, 12, . . . ) denote steps. When the external memory select key 95 is operated, an external flag OF is set by an external control not shown, while when the internal memory select key 94 is operated, the external flag OF is reset by the external control.

Figure 6:
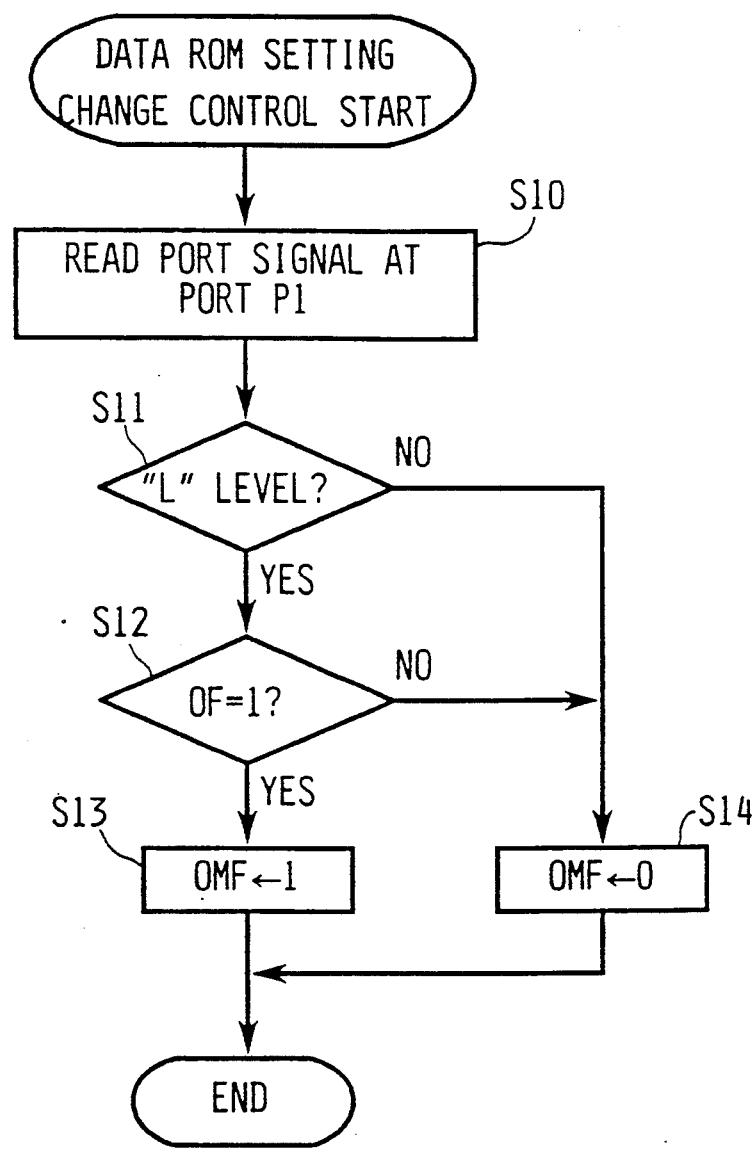
FIG. 6 is a flowchart illustrating a routine of data ROM setting change control.
Figure 7:
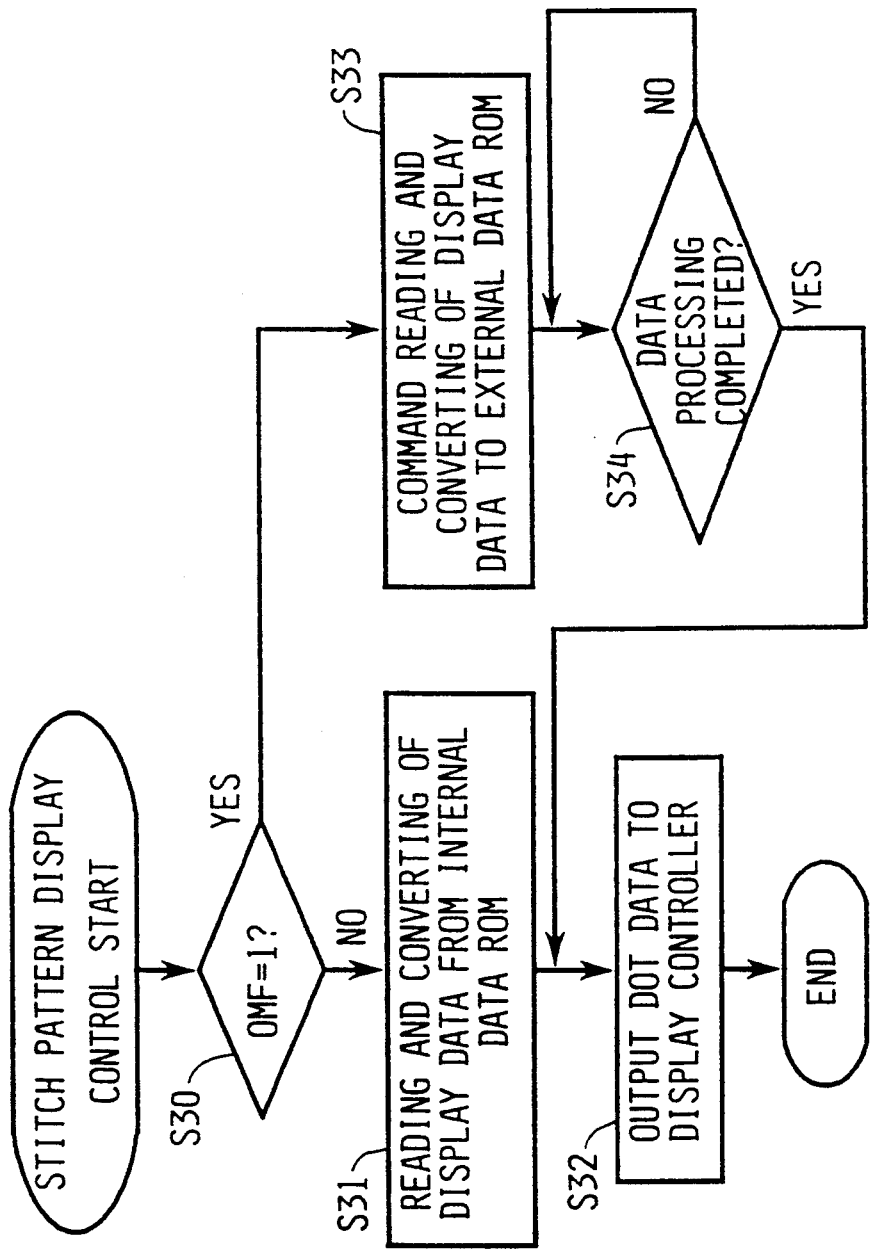
FIG. 7 is a flowchart illustrating a routine of stitch pattern display control.
Figure 8:
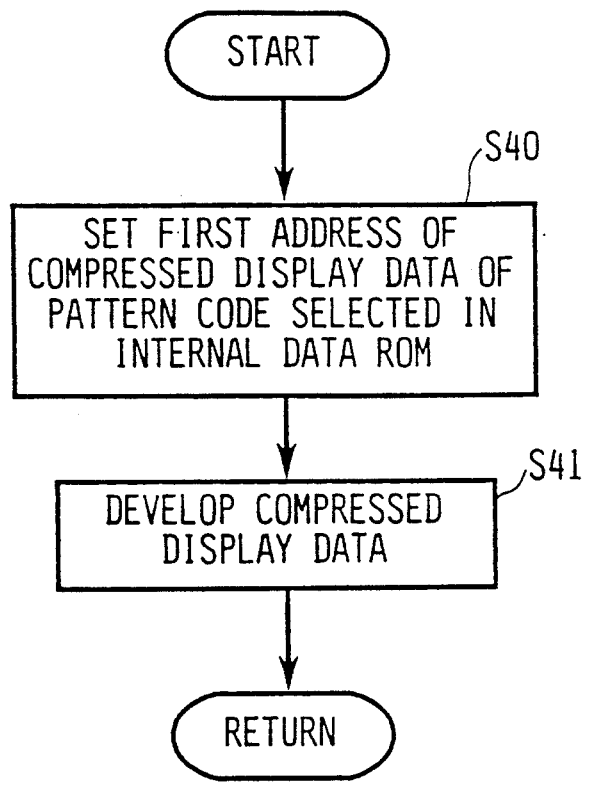
FIG. 8 is a flowchart illustrating a routine of data-read-and-convert control for display data stored in an internal data ROM.
Figure 9:
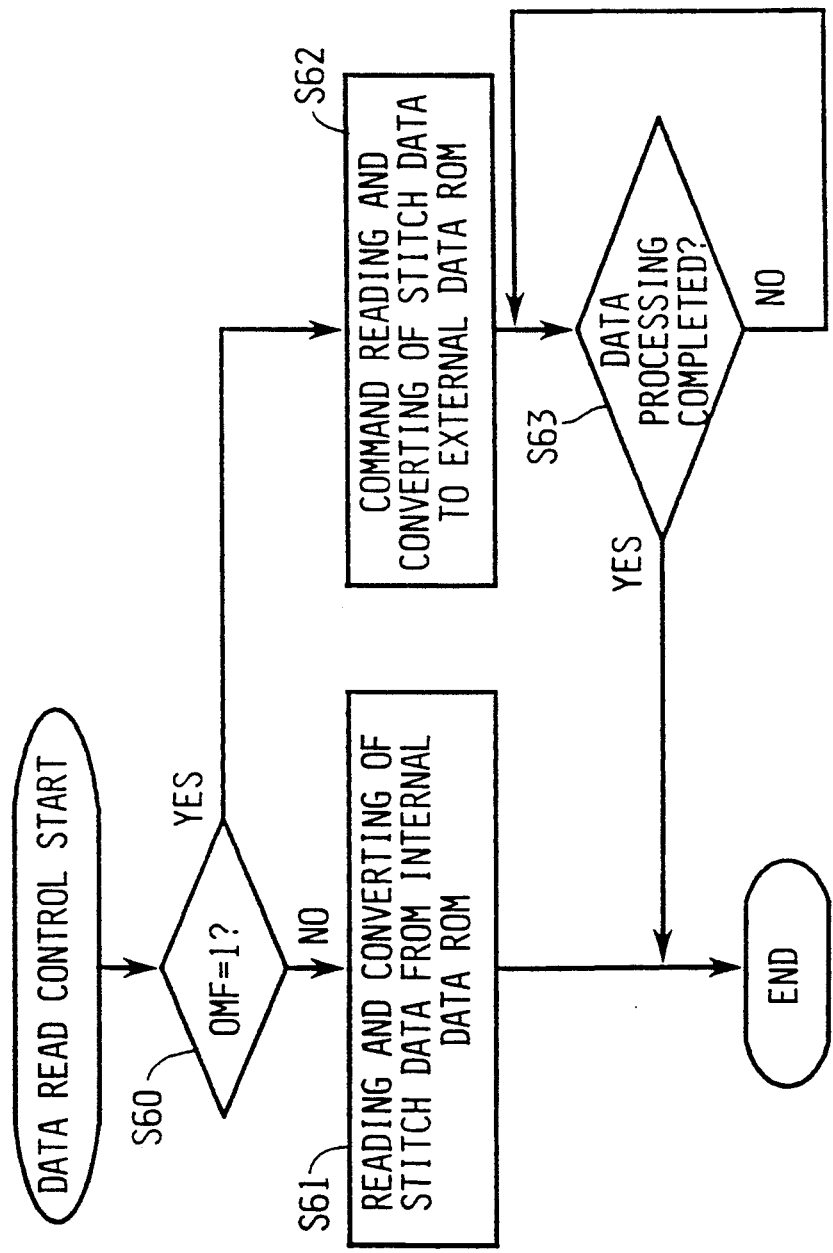
FIG. 9 is a flowchart illustrating a routine of data read-and-convert control for display data stored in an external data ROM.
Figure 10:
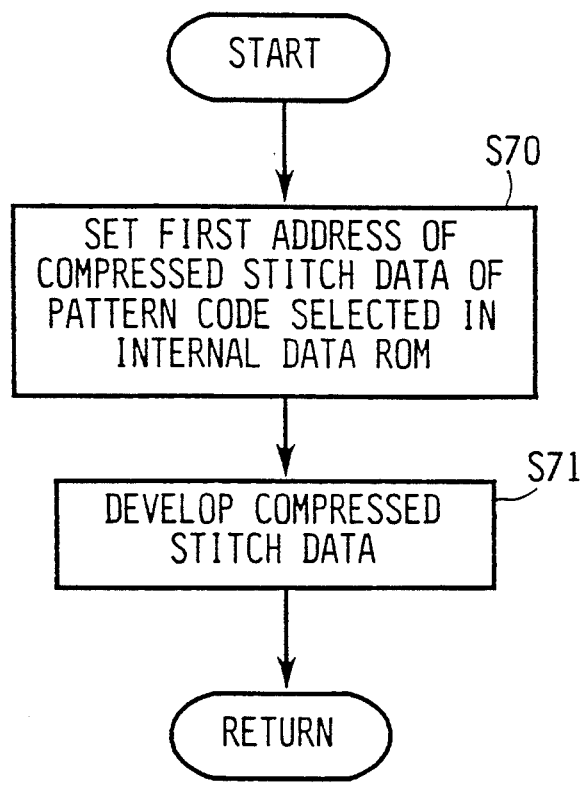
FIG. 10 is a flowchart illustrating a routine of stitch data read control.
Figure 11:
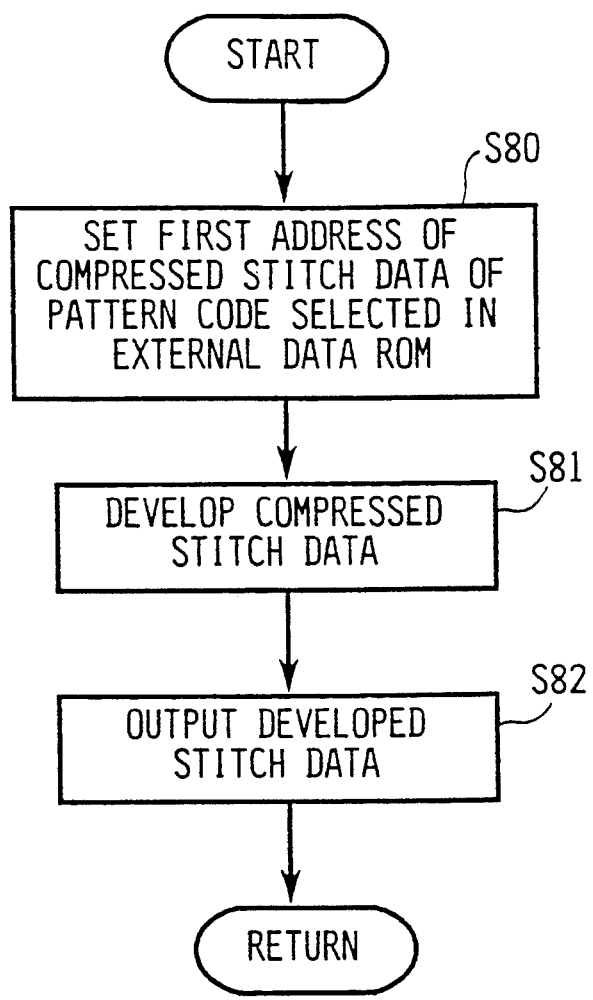
FIG. 11 is a flowchart illustrating a routine of data read-and-convert control for stitch data stored in the internal data ROM.

First, the data ROM setting change control to be executed by interrupt processing for every minute period of time to a main routine will be described with reference to FIG. 6. At the start of this control, a port signal at the input port P1 is first read (S10). If the port signal is of the "L" level, that is, if the ROM card 50 is mounted to the machine body (S11: Yes), and if the external flag OF is set (S12: Yes), an external memory flag OMF is set (S13). Then, this control is ended and returned to the main routine. On the other hand, if the port signal read is of the "H" level, that is, if the ROM card 50 is not mounted to the machine body (S11: No), or if the ROM card 50 is mounted but the external flag OF is reset (S11: Yes; S12: No), the external memory flag OMF is reset (S14).

In the case where the internal memory select key 94 is operated to designate the internal data ROM 36, a desired one of the stitch pattern group display data stored in the ROM 36 is selected by operating a next key or a previous key, for example, and is converted into dot data to be displayed on the display 10. When a desired stitch pattern in the designated pattern group is selected by operating the touch key 11, the stitch pattern display control (see FIG. 7) is executed. At the start of this control, since the external memory flag OMF has been reset (S30: No), reading and converting control of the display data from the internal data ROM 36 (see FIG. 8) is executed (S31). At the start of this control, a first address of the compressed display data corresponding to a pattern code selected in the internal data ROM 36 is set according to the pattern group display data being displayed and a key signal from the touch key 11 (S40). Then, this compressed display data is read and converted into uncompressed dot data by the display data read-and-convert control program stored in the ROM 37 (S41). Then, this control is ended to be returned. The dot data is supplied to the display controller 32, and is displayed in a selected pattern display area 10e shown in FIG. 1 (S32).

On the other hand, in the case where the external memory select key 95 is operated to designate the external data ROM 51, a desired one of the stitch pattern group display data stored in the ROM 51 is selected by operating a next key or a previous key, for example, and is converted into dot data to be displayed on the display 10. When a desired stitch pattern in the designated pattern group is selected by operating the touch key 11, the stitch pattern display control (see FIG. 7) is executed. At the start of this control, since the external memory flag OMF has been set (S30: Yes), the external data ROM 51 is commanded to execute display data read-and-convert control (see FIG. 9) (S33). On receipt of this command, the display data read-and-convert control program stored in the external data ROM 51 is started. At the start of this control, a first address of the compressed display data corresponding to a pattern code selected in the external data ROM 51 is set according to the pattern group display data being displayed and a key signal from the touch key 11 (S50). Then, this compressed display data is read and converted into uncompressed dot data by the display data read-and-convert control program stored in the ROM 51 (S51). The dot data is transferred to the buffer of the RAM 38 in the control device C (S52). Upon completion of the transfer of the dot data (S34: Yes), the dot data is supplied to the display controller 32, and is displayed in the selected pattern display area 10e shown in FIG. 1 (S32).

Next, the stitch data read control (see FIG. 10) for reading stitch data of the selected stitch pattern and developing the same is started. At the start of this control, if the external memory flag OMF is reset (S60: No), reading and converting control (see FIG. 11) of stitch data from the internal data ROM 36 is executed (S61). At the start of this control, a first address of compressed stitch data corresponding to a pattern code selected in the internal data ROM 36 is set (S70). Then, all stitch data relating to the single selected stitch pattern is read and developed by the stitch data read-and-convert control program stored in the ROM 36. The stitch data thus developed are converted into driving data for driving the needle bar rocking stepping motor 47 and driving data for driving the feed dog driving stepping motor 48 by the stitch data read-and-convert control program, and these driving data are transferred to the buffer of the RAM 38 (S71). Then, this control is ended and returned to the main routine.

On the other hand, at the start of the stitch data read control, if the external memory flag OMF is set (S60: Yes), the external data ROM 51 is commanded to execute stitch data read-and-convert control (see FIG. 9) (S62). On receipt of this command, the stitch data read-and-convert control program stored in the external data ROM 51 is started. At the start of this control, a first address of compressed stitch data corresponding to a pattern code selected in the external data ROM 51 is set (S80). Then, all stitch data relating to the single selected stitch pattern is read and developed by the stitch data read-and-convert control program stored in the ROM 51. The stitch data thus developed are converted into driving data for driving the needle bar rocking stepping motor 47 and driving data for driving the feed dog driving stepping motor 48 by the stitch data read-and-convert control program (S81), and these driving data are transferred to the buffer of the RAM 38 (S82).

Thereafter, when the start/stop switch 13 is operated, sewing is carried out according to the driving data stored in the buffer as mentioned above.

As described above, the compressed display data and the compressed stitch data of a plurality of stitch patterns are stored in the ROM card 50, and the control program for compressed display data reading and the control program for compressed stitch data reading are also stored in the ROM card 50. The compressed display data of a selected stitch pattern is converted into dot data, and the dot data is supplied to the RAM 38 in the control device C, while the compressed stitch data of a selected stitch pattern is converted into driving data for driving the stepping motors 47 and 48, and the driving data is supplied to the RAM 38 in the control device C. Thus, irrespective of difference between the compressed condition of the compressed stitch data and the compressed display data in the external data ROM 51 and the compressed condition of the compressed stitch data and the compressed display data in the internal data ROM 36, the selected stitch pattern can be displayed on the display 10, and sewing can be carried out by using the driving data. Accordingly, it is unnecessary to identify a data structure of the display data and the stitch data in the ROM 36 with a data structure of the display data and the stitch data in the ROM 51. Furthermore, it is unnecessary to change the data structure in the ROM 51 even when the data structure in the ROM 36 is changed. Accordingly, a degree of freedom in designing and manufacturing of the ROM 51 and flexibility of the ROM 51 can be greatly improved.

The present invention may be applied to an electronically controlled sewing machine equipped with an embroidering device for sewing an embroidery pattern. In this case, the embroidering device may be provided with a first stepping motor and a second stepping motor for independently driving the needle 6 and the work fabric relatively in the X direction and the Y direction by using the driving data to be supplied from the ROM card 50.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. An electronically controlled sewing machine and external memory, wherein the sewing machine comprises:

driving means for generating relative movement of a needle and a work fabric in an X direction and a Y direction perpendicular to the X direction in a plane intersecting a longitudinal axis of the needle;
  control manes for controlling said driving means; and
  a connector for removably connecting said external memory to said sewing machine; and
  wherein the external memory comprises:
    memory means for storing stitch data of at least one stitch pattern and for storing a read-and-convert control program for reading the stored stitch data;
    converting means for converting said read stitch data into driving data; and
    outputting means for supplying the driving data to said control means of said sewing machine for controlling said driving means for relative movement in the X and Y directions,
    wherein said external memory is a ROM card.

2. The electronically controlled sewing machine and external memory according to claim 1, further comprising selecting means for selecting data from said external memory.

3. The electronically controlled sewing machine and external memory according to claim 1, wherein the memory means for storing stitch data stores compressed stitch data.

4. The electronically controlled sewing machine and external memory according to claim 1, wherein the sewing machine further comprises:

internal memory means for storing stitch data of at least one stitch pattern and for storing a control program, said control program reading the stored stitch data and converting read stitch data into controlling data for the control means; and
  selecting means for selecting a stitch pattern to be sewn by the sewing machine from the stitch data stored in the memory means of the external memory and the internal memory means of the sewing machine.

5. The electronically controlled sewing machine and external memory according to claim further comprising a select flag which is set when the selecting means selects the stitch pattern stored in the memory means.

6. The electronically controlled sewing machine and external memory according to claim 5, further comprising an external flag which is set when the connector connects the external memory and the select flag is set, wherein the converting means of the external memory converts the read stitch data and the outputting means supplies the driving data when the external flag is set.

7. The electronically controlled sewing machine and external memory according to claim 1, wherein said driving means comprises a first stepping motor for driving the needle in the X direction; and
  a second stepping motor for driving the work fabric in the Y direction, the first and second motors driving the needle and work fabric independently with respect to each other.

8. An electronically controlled sewing machine and external memory, wherein the sewing machine comprises:

a display device having a liquid crystal display;
  control means for controlling said display device; and
  a connector for removably connecting said external memory to said sewing machine; and
  wherein the external memory comprises:
    memory means for storing a plurality of display data for a display pattern on said liquid crystal display and for storing a read-and-convert control program for reading the display data;
    converting means for converting said read display data into driving data relating to the display pattern on said liquid crystal display; and
    transferring means for supplying the driving data to said control means,
    wherein said external memory is a ROM card.

9. The electronically controlled sewing machine and external memory according to claim 8, further comprising selecting means for selecting data from said external memory.

10. External memory according to claim 8, wherein the memory means stores compressed display data for a display pattern for a display on the sewing machine.

* * * * *